United States Patent
Sako et al.

(10) Patent No.: US 7,362,671 B2
(45) Date of Patent: Apr. 22, 2008

(54) OPTICAL DISC RECORDING AND/OR PLAYING APPARATUS AND METHOD

(75) Inventors: Yoichiro Sako, Tokyo (JP); Takashi Kihara, Chiba (JP); Toyokazu Noda, Tokyo (JP); Mamoru Akita, Kanagawa (JP); Takamasa Yamagishi, Kanagawa (JP)

(73) Assignee: Sony Corporation (JP)

( * ) Notice: Subject to any disclaimer, the term of this patent is extended or adjusted under 35 U.S.C. 154(b) by 581 days.

(21) Appl. No.: 10/398,596

(22) PCT Filed: Aug. 12, 2002

(86) PCT No.: PCT/JP02/08221

§ 371 (c)(1),
(2), (4) Date: Apr. 3, 2003

(87) PCT Pub. No.: WO03/017274

PCT Pub. Date: Feb. 27, 2003

(65) Prior Publication Data

US 2004/0027980 A1 Feb. 12, 2004

(30) Foreign Application Priority Data

Aug. 13, 2001 (JP) ............................. 2001-245665

(51) Int. Cl.
*G11B 7/004* (2006.01)
*G11B 7/007* (2006.01)

(52) U.S. Cl. ............................. 369/47.41; 369/47.45; 369/53.34

(58) Field of Classification Search ...................... None
See application file for complete search history.

(56) References Cited

U.S. PATENT DOCUMENTS

| 4,397,011 A | | 8/1983 | Ogawa et al. |
| 4,543,650 A | | 9/1985 | Wachi et al. |
| 4,727,530 A | * | 2/1988 | Tomisawa ................. 369/47.45 |
| 4,761,692 A | | 8/1988 | Yoshida et al. |
| 4,789,975 A | * | 12/1988 | Taniyama ................. 369/47.47 |
| 5,930,210 A | | 7/1999 | Timmermans et al. |
| 5,953,299 A | * | 9/1999 | Miyamoto et al. .......... 369/59.2 |
| 6,118,742 A | * | 9/2000 | Matsui et al. ............. 369/47.48 |
| 6,134,201 A | | 10/2000 | Sako et al. |
| 6,304,971 B1 | | 10/2001 | Kutaragi et al. |
| 2001/0024412 A1 | * | 9/2001 | Fujiwara ................... 369/53.34 |

FOREIGN PATENT DOCUMENTS

JP 57-058269A A 4/1982

(Continued)

*Primary Examiner*—William Korzuch
*Assistant Examiner*—Nathan Danielsen
(74) *Attorney, Agent, or Firm*—Lerner, David, Littenberg, Krumholz & Mentlik, LLP

(57) ABSTRACT

A data recording and/or playing method for recording or playing data to or from an optical disc having a first recording area, where a frame sync signal and the data are recorded, and a second recording area, where a predetermined pattern is preformed, and having address data recorded therein, while rotating the optical disc by a rotation drive unit. The optical disc rotated by the rotation drive unit is scanned by a head unit, and when the head unit is scanning the first recording area, the rotation drive unit is controlled in a first rotation control mode. When the head unit is scanning the second recording area, the rotation drive unit is controlled in a second rotation control mode.

26 Claims, 12 Drawing Sheets

FOREIGN PATENT DOCUMENTS

| JP | 57-162110 A | A | 10/1982 |
| JP | 61-009989 | A | 5/1986 |
| JP | 62-242487 A | A | 10/1987 |
| JP | 5-325193 A | A | 12/1993 |
| JP | 7-006499 A | A | 1/1995 |
| JP | 8-147704 A | A | 6/1996 |
| JP | 9-115241 A | A | 5/1997 |
| JP | 2001-344911 A | A | 12/2001 |

* cited by examiner

FIG.9A
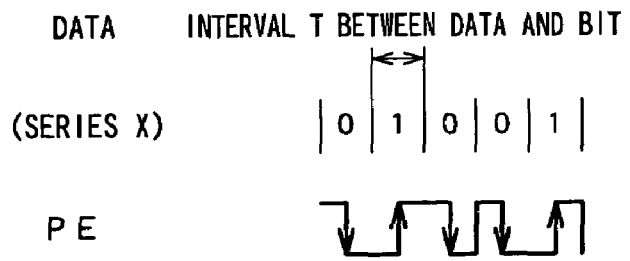
FIG.9B
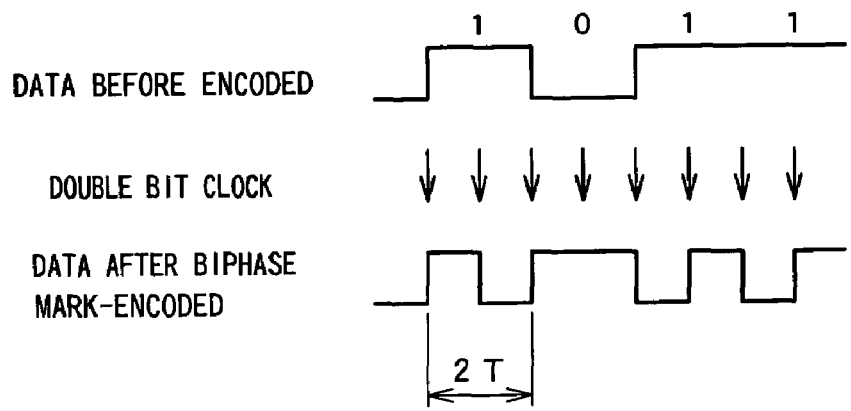
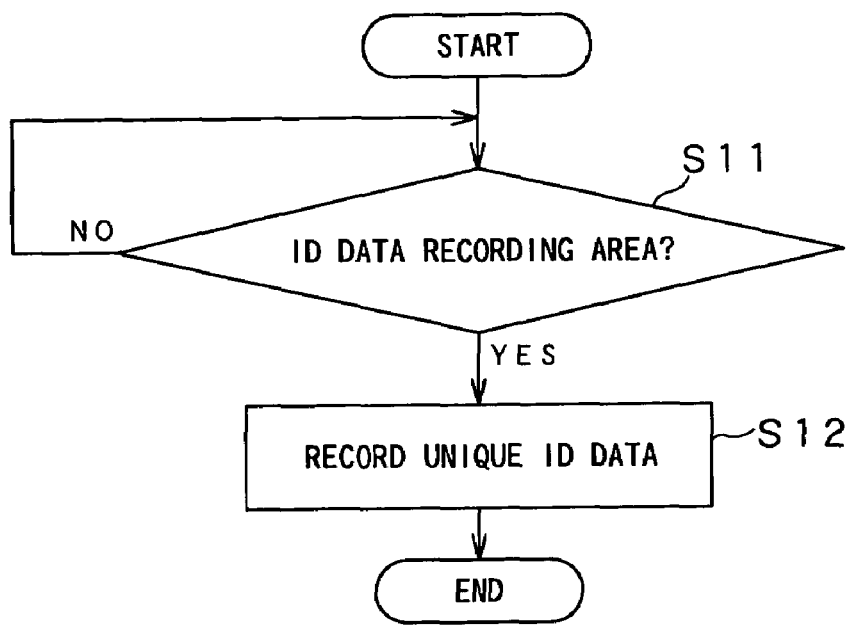
FIG.10

OPTICAL DISC RECORDING AND/OR PLAYING APPARATUS AND METHOD

TECHNICAL FIELD

The present invention generally relates to an optical disc recording and/or playing apparatus for an optical disc having a first area in which content data is recorded and a second area in which unique identification data for a recording medium is recorded, and more particularly to an optical disc recording and/or playing apparatus and method, in which the disc rotation is controlled in a manner varying from the first to second area of an optical disc.

BACKGROUND ART

In a compact dis (will be referred to as "CD" hereunder) for example, one frame (588 channel bits) is composed of 32 symbols and each frame has stored therein a frame sync signal for detection of the head of the frame. In CD, data going to be recorded undergoes 8-14 (eight-to-fourteen) modulation (=EFM). In EFM, the maximum run length is 10. Therefore, the frame sync signal is formed from a pattern not included in EFM, more specifically, pattern of 11T and 11T' (the apostrophe (') indicates an inversion) and a pattern of 2T (10000000000100000000010). The sync signal is also used for a rotation servo control to drive CD at a CLV (constant linear velocity). That is, the patterns 11T and 11T' in the sync signal are longest ones in signals recorded in CD similarly to the maximum run length (that is, "11") in EFM. On this account, the rotation servo controller detects the patterns, measures the length of them using a reference clock, adjusts the CD rotation velocity for the measured length to correspond to a reference length of time, and makes a PLL (phase-locked loop) control.

Some of the optical discs such as a CD, digital versatile disc (DVD) and the like have unique identification data such as a serial number recorded therein. The unique identification data is recorded in a predetermined area by a modulation method similar to that used for recording other data. The unique identification data is read from an optical disc being rotated at a CLV, for example, as in reading of the other data. In addition to the use for identification of an optical disc, the unique identification data can be used as play limitation data for allowing content data to be read only when it is desired to read the unique identification data, for example.

Note here that an optical disc such as content data recorded therein such as a CD, DVD or the like records digital data and thus permits to easily copy the data read from the optical disc to another recording medium without any deterioration of the data. Therefore, even in a system in which the unique identification data is used as such a play limitation data to allow or inhibit reading of content data, if the content data is copied as it is to a recordable medium, the unique identification data will also be copied like the other data. Namely, the unique identification data will also be recorded to an optical disc to which the content data is illegally copied, with a result that in the same system, a player can read the unique identification data from the optical disc to which the content data has illegally been copied and can play the optical disc to which the content data has illegally been copied. Thus, if the content data is illegally copied, it will hamper the possible interest of the copyright holder.

To avoid the above, some of the optical discs have provided in a part of the recording area thereof an identification data recording area for recording such unique identification data. The identification data recording area has formed therein pit patterns identical in interval of inversion to each other, and has unique identification data thermally recorded on the reflective layer to overlap the pit patterns. When reading the unique identification data from the identification data recording area, the rotation servo controller to control the rotation of the optical disc will take the pit patterns identical in inversion interval to each other as a frame sync signal and thus be disabled to rotate the optical disc at a normal velocity of rotation.

DISCLOSURE OF THE INVENTION

Accordingly, the present invention has an object to overcome the above-mentioned drawbacks of the related art by providing an optical disc recording and/or playing apparatus and method, in which in the rotation servo control on a recording medium having first and second areas defined therein and formed, in the second area, patterns not included in a sync signal pattern formed in the first area, the rotation servo control is so made in a different manner from the first to second area that data can positively be recorded and/or read whether access is made to the first or second area.

The above object can be attained by providing an optical disc recorder and/or player including according to the present invention:

a rotation drive unit to rotate an optical disc having defined therein a first recording area in which a frame sync signal and data are recorded and a second area in which a predetermined pattern has been preformed and having address data recorded thereon;

a head unit to scan the optical disc by projecting a laser beam to the latter; and a controller to control the rotation drive unit in a first rotation control mode when the head unit scans the first recording area and in a second rotation control mode when the head unit scans the second recording area.

Also the above object can be attained by providing an optical disc recording and/or playing method, wherein:

an optical disc, having defined therein a first recording area in which a frame sync signal and data are recorded and a second area in which a predetermined pattern has been preformed and having address data recorded thereon and being rotated by a rotation drive unit, is scanned by a head unit;

when the head unit scans the first recording area, the rotation drive unit is controlled in a first rotation control mode; and when the head unit scans the second recording area, the rotation drive unit is controlled in a second rotation control mode.

Also the above object can be attained by providing an optical disc rotation controlling method wherein:

an optical disc, having defined therein a first recording area in which a frame sync signal and data are recorded and a second area in which a predetermined pattern has been preformed and having address data recorded thereon and being rotated by a rotation drive unit, is scanned by a head unit;

when the head unit scans the first recording area, the rotation drive unit is controlled in a first rotation control mode; and when the head unit scans the second recording area, the rotation drive unit is controlled in a second rotation control mode.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIGS. 9A and 9B explain phase encoding and biphase-mark encoding, respectively.

FIG. 10 shows a flow of operations of the recorder.

BEST MODE FOR CARRYING OUT THE INVENTION

A data recording medium, and a data recording apparatus and method, according to the present invention, will be described with reference to the accompanying drawings.

Figure 1:
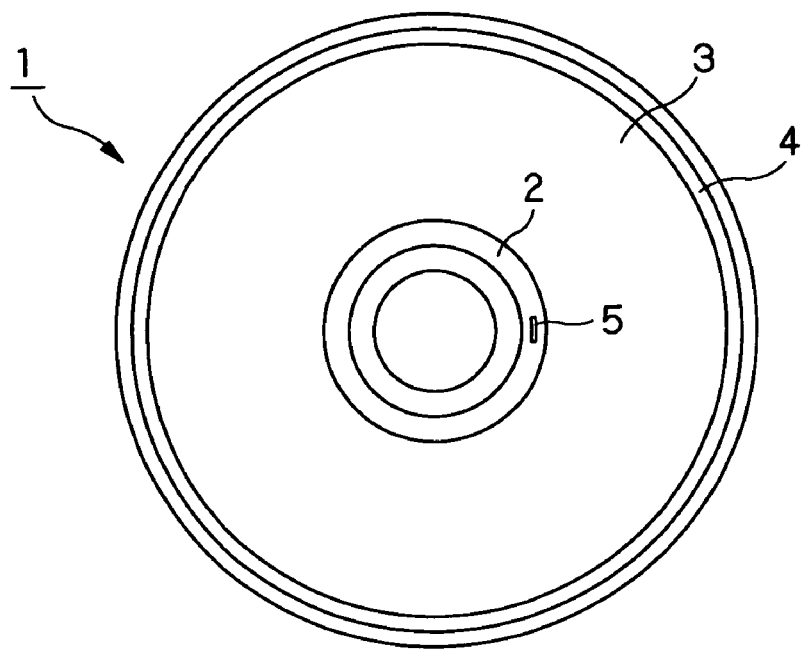
FIG. 1 explains the construction of an optical disc used with the recorder and/or player according to the present invention.

The data recording medium according to the present invention is a read-only optical disc. As shown in FIG. 1, the optical disc generally indicated with a reference 1 has formed along the inner circumference thereof a lead-in area 2 where TOC (table of contents) data and the like are recorded. And, the optical disc 1 has formed along the outer circumference of the lead-in area a program area 3 where data such as content data and the like are recorded. Further, the optical disc 1 has a lead-out area 4 formed along the outer circumference of the program area 3.

As above, TOC data and the like are recorded in the lead-in area 2. The lead-in area 2 has an identification data recording area 5 formed therein. Since the identification data recording area 5 is provided in the lead-in area 2, it is possible to read unique identification data directly after reading the TOC data or the like. The identification data recording area 5 has recorded therein unique identification data for identification of the optical disc itself. The unique identification data includes a recording medium number for distribution registration of the optical disc 1, manufacturing equipment ID data for identification of an equipment used for manufacturing the optical disc 1, copyright ID data and the like for identification of the copyright holder and manager, and also data such as URL (uniform resource locator) or the like for access to a web page connected with the content data recorded in the program area 3.

The program area 3 has recorded therein content data including music data, movie data, image data, moving-picture data, game software, computer program data or the like. The program area 3 has the data recorded therein with a higher density than in CD, for example, a density two times higher than that in CD. It should be noted that data recorded in the recording area 3 may have been encrypted.

Note that in the optical disc 1, the identification data recording area 5 may be provided along the inner circumference of the lead-in area 2 to prevent any other player from accessing the identification data recording area 5, that is, reading data recorded in the identification data recording area. For reading data from the outer-circumferential side of the optical disc 1 first, the identification data recording area 5 may be provided in the lead-out area 4. In this case, the identification data recording area 5 may be provided outside the lead-out area 4 to prevent any other player from accessing the identification data recording area 5.

Figure 2:
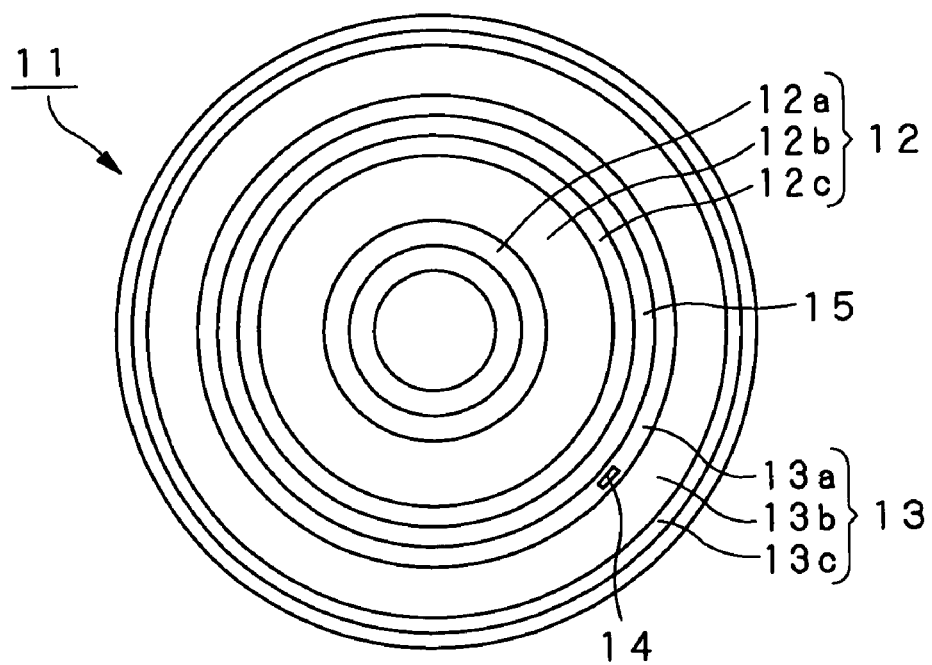
FIG. 2 explains another example of the optical disc used with the recorder and/or player according to the present invention.

The optical disc 1 may be constructed as shown in FIG. 2. The optical disc of this construction is generally indicated with a reference 11. As shown, the optical disc 11 has two sessions, namely, a first session 12 provided along the inner circumference and a second session 13 provided along the outer circumference of the first session 11. Between the first and second sessions 12 and 13, there is provided a mirror area 15 that provides a boundary between the first and second sessions 12 and 13.

The first and second sessions 12 and 13 have provided along the inner circumferences thereof lead-in areas 12a and 13a, respectively, where TOC data and the like of data recorded in program areas 12b and 13b, which will be described below, of the sessions 12 and 13, respectively. The program areas 12b and 13b are provided along the outer circumferences of the lead-in areas 12a and 13a, respectively, and have a program recorded therein. Lead-out areas 12c and 13b are provided along the outer circumferences of the program areas 12b and 13b, respectively. In the optical disc 11, data is recorded more densely in the second session 13 than in the first session 12, for example, with a double density.

For example, in the program area 12b of the first session 12, there is recorded advertisement data or the like in an existing recording format adopted in a CD, DVD or the like and in the program area 13b of the second session 13, content data for which the advertisement data is directed is recorded in a new recording format, for example, in an encrypted form. The program area 12b of the first session 12 has recorded therein audio data having an ordinary sound quality, for example, the same sound quality as in CD, DVD or the like for example, while the program area 13b of the second session 13 has recorded therein audio data having a high sound quality. That is, in the optical disc 11, the second session 13 has recorded therein more valuable data than in the first session 12. In the lead-in area 13a of the second session 13, there is recorded encrypt key data for content data recorded in encrypted form in the program area 13b in addition to TOC data such as address information and the like in the second session 13.

The lead-in area 13a has provided therein an identification data recording area 14 where data for identification of the optical disc itself is recorded. Because of the identification data recording area 14 provided in the lead-in area 13a, it is possible to read unique identification data directly after reading the TOC data recorded in the lead-in area 13a. The unique identification data includes a recording medium number for distribution registration of the optical disc 11, manufacturing equipment ID data for identification of an equipment used for manufacturing the optical disc 11, copyright ID data and the like for identification of the copyright holder and manager, and also data such as URL or the like for access to a web page connected with the content data recorded in the program area 3.

The identification data recording area 14 may be provided in the lead-in area 12a of the first session 12, along the inner circumference of the lead-in area 12a, in the lead-out area 12c or along the outer circumference of the lead-out area 12c, beside the lead-in area 13a of the second session 13. Alternatively, the identification data recording area 14 may be provided along the inner circumference of the lead-in area 13a of the second session 13, in the lead-out area 13c or along the outer circumference of the lead-out area 13c.

Figure 3:
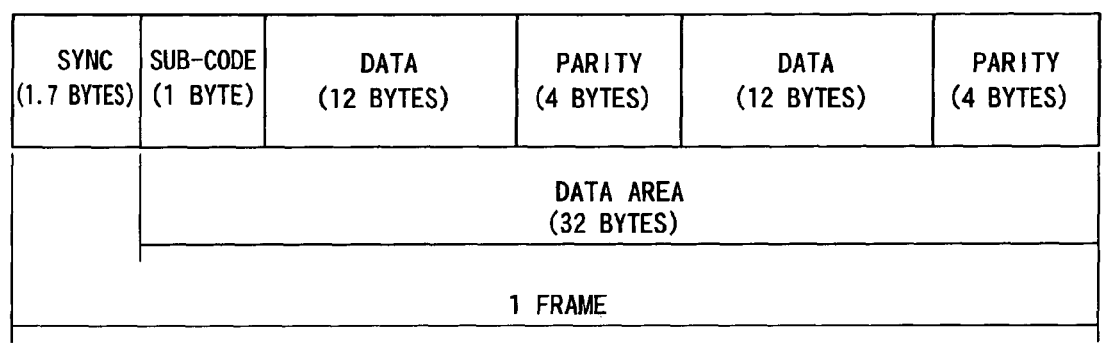
FIG. 3 explains a signal format recorded to the optical disc used with the optical disc recorder and/or player according to the present invention.

The recording format in other than the identification data recording area 5 or 14 of the optical disc 1 or 11, respectively, where the above data is recorded, will be described with reference to FIG. 3. As shown in FIG. 3, one frame includes a 1.7-byte frame sync signal part, a 1-byte sub-code part and a 32-byte data area in this order. The data area is formed from two pairs of 12-byte data and 4-bytes parity. More particularly, the frame sync signal part is formed from pattern signals, namely, frame sync signals, of 11T and 11T' (the apostrophe (') indicates an inversion) and 2T (1000000000010000000000010). To facilitate the detection of frame sync signals in a player, such frame sync signals include patterns of 11T and 11T' whose length is equal to the maximum run length (11T) of EFM. The optical disc 1 has the frame sync signals recorded over the lead-in area 2, program area 3 and lead-out area 4 thereof, and the optical disc 11 has the frame sync signals recorded over the first and second sessions 12 and 13 thereof, both in the recording format show in FIG. 3.

The optical disc 1 (11) has a pit pattern defined by pits and lands of 3T and 3T' provided in the identification data recording area 5 (14) thereof. The identification data recording area 5 (14) has unique identification data of a predetermined pit length recorded on the recording track of the pit pattern of 3T and 3T' or between the recording tracks.

The aforementioned recording format is just an example. The number of bytes in each area and allocation of the areas may arbitrarily be set.

Note here that the optical disc 1 (11) is basically a read-only recording medium and has provided in other than the identification data recording area 5 (14) thereof a pit pattern of pits and lands corresponding to data to be recorded. The unique identification data is thermally recorded on a reflective layer in the identification data recording area 5 (14) where there is provided a pit pattern of pits and lands formed alternately and repeatedly, equal in length to each other, more specifically, a pit pattern of pits and lands of 3T and 3T' formed alternately and repeatedly. In this case, the pit pattern of the pits and lands formed alternately and repeatedly, having the same length, guides laser light for recording identification data to the recording area 5 (14).

How to manufacture the optical disc 1 (11) will be described herebelow with reference to FIG. 4. In a resist coating step 21, a glass master is coated with photoresist. Next, in a cutting process 22, laser light is projected to the photoresist on the glass master to form, in the photoresist layer, a latent image of a pit pattern of pits and lands corresponding to data to be recorded. Then, in a development and fixation process 23, the laser-cut master having formed in the photoresist the latent image corresponding to the pit pattern has the photoresist developed and fixed. Thereafter, in a metal master manufacturing step 24, the laser-cut master is plated on the surface thereof with a metal by electrolytic plating to form a metal master that is a mother. Next, in a stamper making step 25, a stamper is made based on the metal master. In a substrate forming step 26, the stamper made in the step 25 is installed in a forming die of an injection molding machine, and transparent resin such as polycarbonate or acrylic is injected into the die, thereby forming a disc substrate. The pit pattern formed in the master in the cutting step 22 is stamped to the disc substrate formed through the aforementioned steps. Next, in a reflective layer forming step 27, the side of the disc substrate, having the pit pattern formed thereon, is coated with a metallic material by sputtering or deposition, to thereby forming a reflective layer. This reflective layer is used to thermally record unique identification data in the identification data recording area 5 (14) of the optical disc 1 (11).

Note here that the material of the reflective layer formed on the optical disc 1 (11) should be a one in which unique identification data can be recorded. The reflective layer used in the optical disc 1 (11) has a reflectivity similar to that of the reflective layer in CD or DVD or such a reflectivity as allows the conventional optical pickup to read data recorded in the reflective layer, the reflectivity being caused to vary by a thermal recording using laser light as a recording light beam. That is, the reflective layer is formed from a metal layer whose reflectivity against a reading light beam is caused by a thermal recording using laser light to vary within a range over about 0.5% and under 10%. More specifically, the reflective layer is formed from an alloy of aluminum in which a slight amount of germanium is mixed.

In a next protective layer coating step 28, the reflective layer formed in the reflective layer forming step 27 is coated thereon with a UV curable resin by spin coating, and then exposed to ultraviolet rays. Thus a protective layer is formed. To read data from, or write identification data to, the optical disc 1 (11) thus formed, laser light as a recording light beam will be projected to the optical disc 1 (11) from the side of the latter opposite to the side having the protective layer formed thereon. Thereafter, in an identification data recording step 29, unique identification data is recorded to the identification data recording area 5 (14) of the optical disc 1 (11). In the step 29, for recording identification data, laser light whose output level is higher than that of a reading laser light is modulated by the identification data to be recorded, and the identification data is recorded on a pattern in which 3T and 3T' are repeatedly arranged or along this pattern. At this time, the reflective layer is metamorphosed by the recording laser light.

Figure 5:
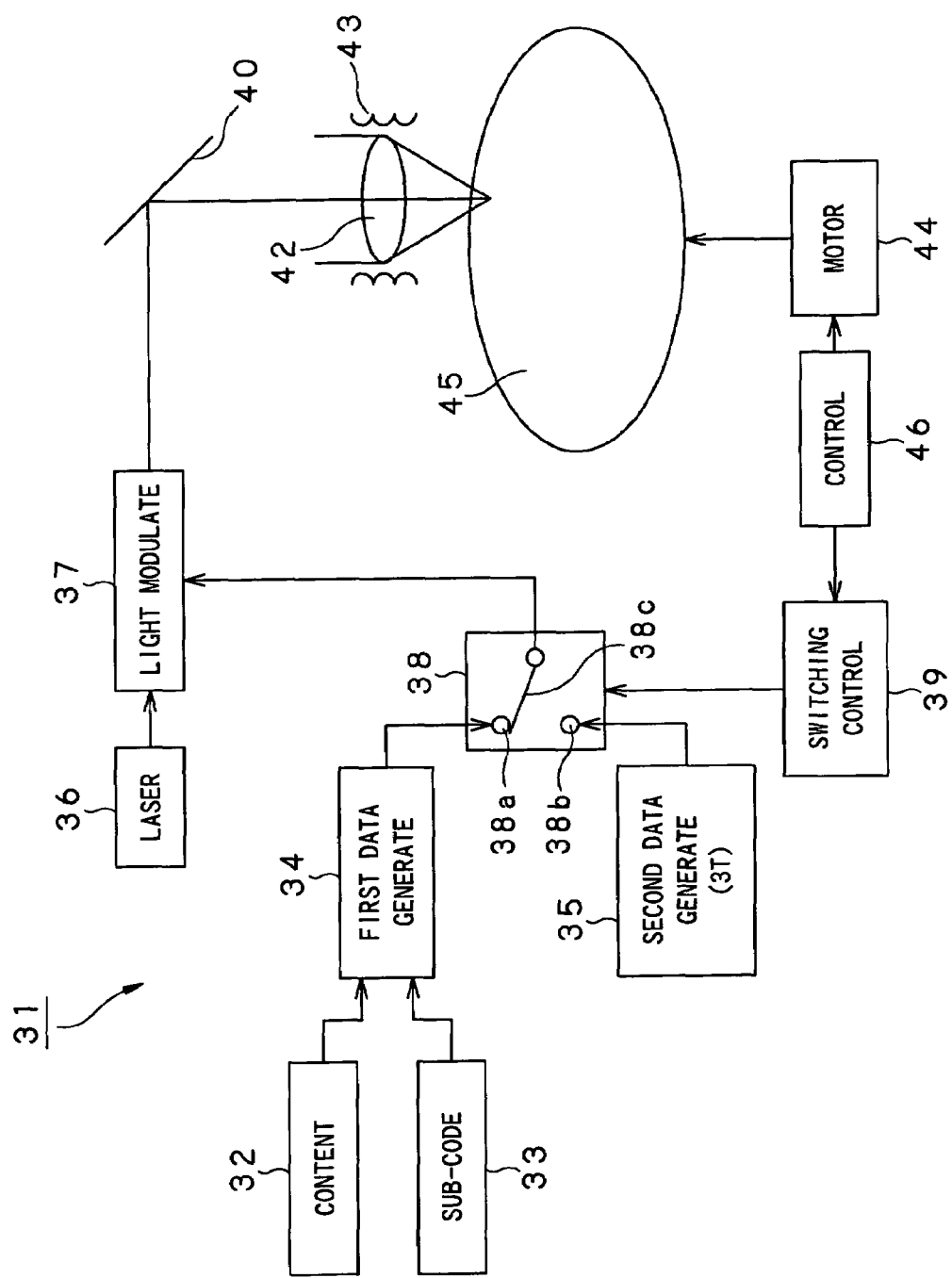
FIG. 5 is a block diagram of a cutting apparatus used in manufacture of the optical disc.

Here, a cutting apparatus 31 used in the cutting step 22 to cut, by laser light, the pit pattern of pits and lands corresponding to data to be recorded to provide a laser-cut master will be described with reference to FIG. 5. As shown, the cutting apparatus 31 includes a content generator 32 to produce content data to be recorded, a sub-code generator 33 to produce sub-code data such as address information or the like, a first data generator 34 to produce data to be recorded by adding together data output from the content generator 32 and data output from the sub-code generator 33, a second data generator 35 to produce 3T and 3T' data forming the identification data recording area 5 (14) where unique identification data is recorded, a laser source 36 to emit laser light, a light modulator 37 to modulate the laser light based on data from the first and second data generators 34 and 35, a switching unit 38 to selectively supply either data output from the first data generator 34 or data output from the second data generator 35 to the light modulator 37, a switching control unit 39 to control the switching operation of the switching unit 38, a mirror 40 to reflect modulated laser light from the light modulator 37, a moving mechanism to move the mirror 40, an objective lens 42 to focus reflected laser light from the mirror 40 on a glass master 45, an objective lens drive unit 43 to move the objective lens 42 in a direction parallel to the optical axis of the objective lens 42, a motor 44 to rotate the glass master 45, and a controller 46 to control the motor 44.

Supplied with content data to be recorded to the program area 3 of the optical disc 1 or to the program areas 12b and 13b of the first and second sessions 12 and 13, respectively, of the optical disc 11, the content generator 32 encodes the content data as a sample by a combination of cross interleaving and Reed-Solomon code according to the cross-interleaved Reed-Solomon code (CIRC) algorithm and then modulates the data according to the EFM (eight-to-fourteen modulation) algorithm. Also, supplied with content data to be recorded to the program area 3 of the optical disc 1 or to the program area 13b of the second session 13 of the optical disc 11, the content generator 32 encrypts the content data using encrypt key data, then encodes the data for error correction by CIRC or the like, and modulate the data by EFM or the like. It should be noted that the modulation referred to herein is not limited to EFM but it may be the 8-16 modulation or any other appropriate modulation.

The sub-code generator 33 produces TOC data, sub-code data or the like for the optical disc 1 or 11, and supplies it to the first data generator 34. The first data generator 34 adds together data supplied from the content generator 32 and data supplied from the sub-code generator 33 to produce data to be recorded to the glass master 45. The first data generator 34 supplies the light modulator 37 with data to be recorded via the switching unit 38.

The second data generator 35 produces data used to form a pit pattern defined by pits and lands of 3T and 3T' formed alternately and repeatedly and that is to be provided in the identification data recording area 5 (14). The pit pattern provided in the identification data recording area 5 (14) is not any significant data but it is used only for guiding the laser light when recording unique identification data, for rotation servo control, tracking servo control and focusing servo control.

Note that the second data generator 35 may be adapted to produce data used to form a pit pattern of pits and lands of 3T and 3T' formed alternately and repeatedly, as a pattern not included in the EFM modulation pattern, as well as data used to form a pit pattern defined by pits of 2T, 3T or 98T formed alternately and repeatedly. The second data generator 35 may also be adapted to produce data for a pattern included in EFM.

The switching unit 38 permits to selectively supply the light modulator 37 with either content data output from the fist data generator 34 or data supplied from the second data generator 35 and in which a series of pits and lands of 3T and 3T' is repeatedly arranged. The switching unit 38 operates under the control of the switching control unit 39 to connect a switch piece 38c of the switching unit 38 to a content 38b for supplying data from the second data generator 35 to the light modulator 37 only when recording a pit pattern of pits and lands of 3T and 3T' formed alternately and repeatedly to the identification data recording area 5 (14). In any other case, the switching unit 38 will have the switching piece 38c thereof connected to a contact 38a to supply data output from the first data generator 34 to the light modulator 37.

The aforementioned laser source 36 adopts a gas laser such as argon laser, He—Cd laser or the like. The light modulator 37 adopts an EOM (electrical optical modulator) using the Pockels effect, AOM (acoustic-optical modulator) using ultrasonic wave or the like. The motor 46 is controlled by the controller 44 for the linear velocity to be constant according to a distance of a light beam from the shaft thereof that rotates the glass master 45, for example.

Figure 6:
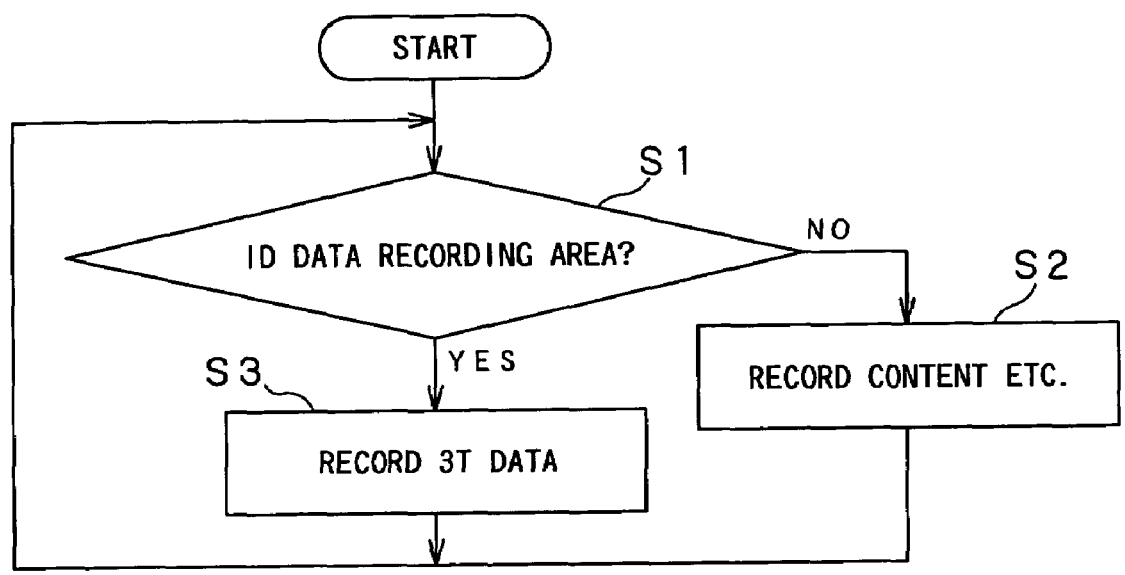
FIG. 6 shows a flow of operations of the cutting apparatus.

Next, how the aforementioned cutting apparatus 31 operates to record data to the glass master 45 will be described with reference to FIG. 6.

First, in step S1, the switching control unit 39 determines whether a position of recording by the laser light emitted from the laser source 36 corresponds to the identification data recording area 5 (14) or not. For example, for moving the glass master 45 and motor 44 radially of the glass master 45 in relation to the laser light emitted from the laser source 36, there is provided a detection mechanism or the like to detect a moving distance of the glass master 45 from the laser light as a reference. The controller 46 determines a recording position based on output signal from the detection mechanism. When the switching control unit 39 has determined that the current recording position does not correspond to the identification data recording area 5 (14), it will go to step S2. On the contrary, when the switching control unit 39 has determined that the current recording position corresponds to the identification data recording area 5 (14), it will got to step S3.

In step S2, to record the data generated by the first data generator 34 to the glass master 45, the switching control unit 39 connects the switching piece 38c of the switching unit 38 to the contact 38a to provide a connection between the first data generator 34 and light modulator 37. When the content generator 32 is supplied with content data to be recorded to itself, it encodes the content data for error correction and makes EFM modulation of the data. The content generator 32 supplies the data processed in predetermined manners to the first data generator 34. The sub-code generator 33 produces address information or the like, and supplies the data to the first data generator 34. The first data generator 34 adds together the data supplied from the content generator 32 and sub-code generator 33, respectively, to produce data to be recorded. Then, the first data generator 34 supplies the data to be recorded to the light modulator 37 via the switching unit 38.

In step S3, the switching control unit 39 connects the switching piece 38c of the switching unit 38 to the contact 38b to provided a connection between the second data generator 35 and light modulator 37. The second data generator 35 produces data to be recorded in a position corresponding to the identification data recording medium 5 (14) and that corresponds to a pit pattern defined by pits and lands of 3T and 3T' formed alternately and repeatedly. The second data generator 35 supplies the data to be recorded to the light modulator 37 via the switching unit 38.

On the other hand, the laser light emitted from the laser source 36 is projected to the light modulator 37. The light modulator 37 modulates the laser light based on data supplied from the first and second data generators 34 and 35, respectively. That is, for recording data to the first session 12 of the optical disc 11 with a standard recording density, namely, with the same recording density as that in the conventional CD, the light modulator 37 modulates the laser light in the same format as that for the CD with the laser light and glass master 45 moved in relation to each other for the track pitch to be 1.6 μm for example. For recording data to the second session 13 of the optical disc 11 or to the optical disc 1, the recording density is elevated to above that for recording the data to the first session 12. For example, the light modulator 37 modulates the laser light in a format different from that for the CD with the laser light and glass master 45 moved for the track pitch to be 1.1 μm, smaller than the above-mentioned 1.6 μm.

The laser light modulated by the light modulator 37 is incident upon the mirror 40. The mirror 40 will bend the laser light path from the light modulator 37 by 90 deg. The laser light whose path has thus been bent by the mirror 40 is collected by the objective lens 42 and projected onto the photoresist-coated glass master 45 being rotated by the motor 44 being a rotation drive. At this time, the objective lens 42 is moved by the objective lens drive unit 43 optical-axially of the laser light, namely, its focus is controlled. As the glass master 45 is moved along with the motor 44 radially thereof in relation to the laser light focused by the objective lens 42 as previously mentioned, a spiral recording track is formed on the photoresist coating on the glass master 45.

Figure 4:
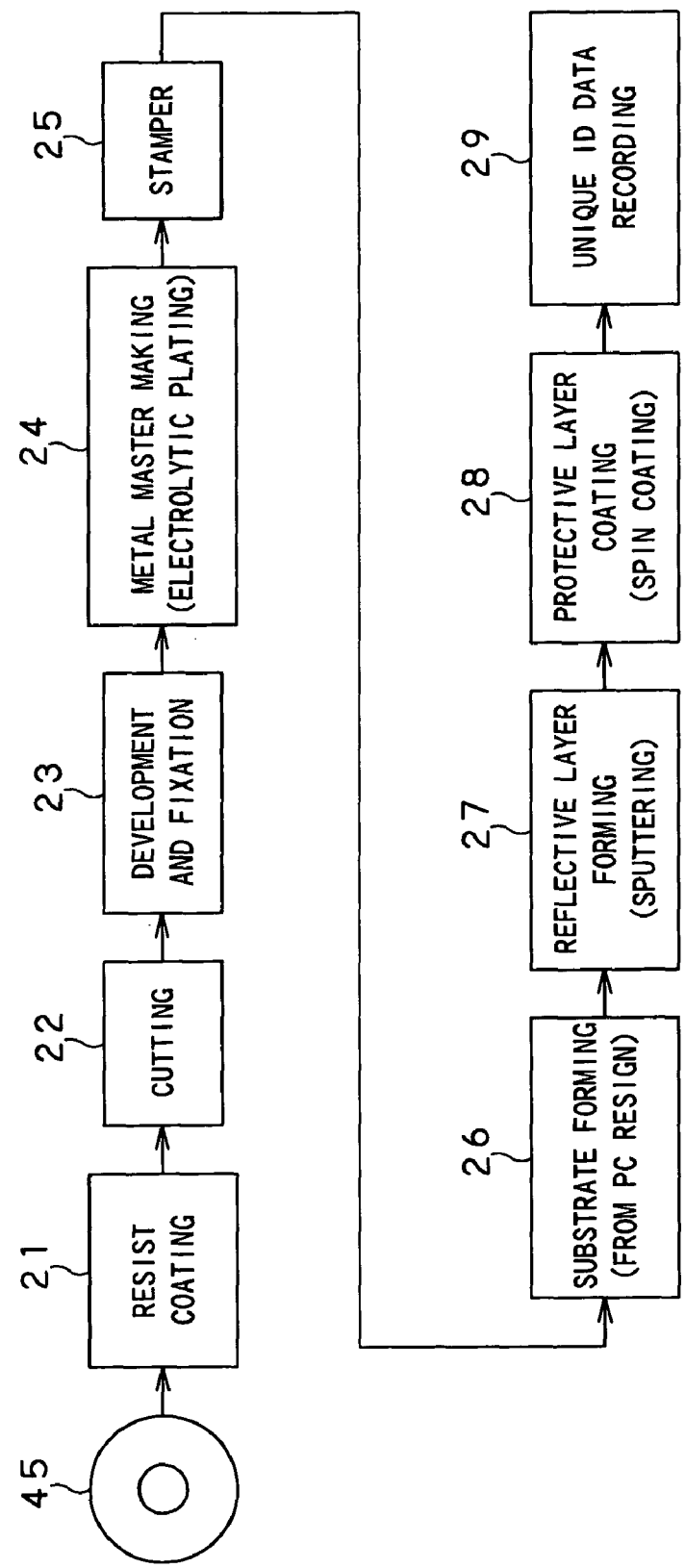
FIG. 4 explains the process of manufacturing the optical disc.

A stamper is formed using the glass master 45 formed by the aforementioned cutting apparatus 31 as in the process shown in FIG. 4. Thus, the optical disc 1 (11), having no unique identification data yet recorded therein, can be produced using the stamper formed by the cutting apparatus 31 in the same manner as for the conventional optical disc such as CD, DVD or the like.

Figure 7:
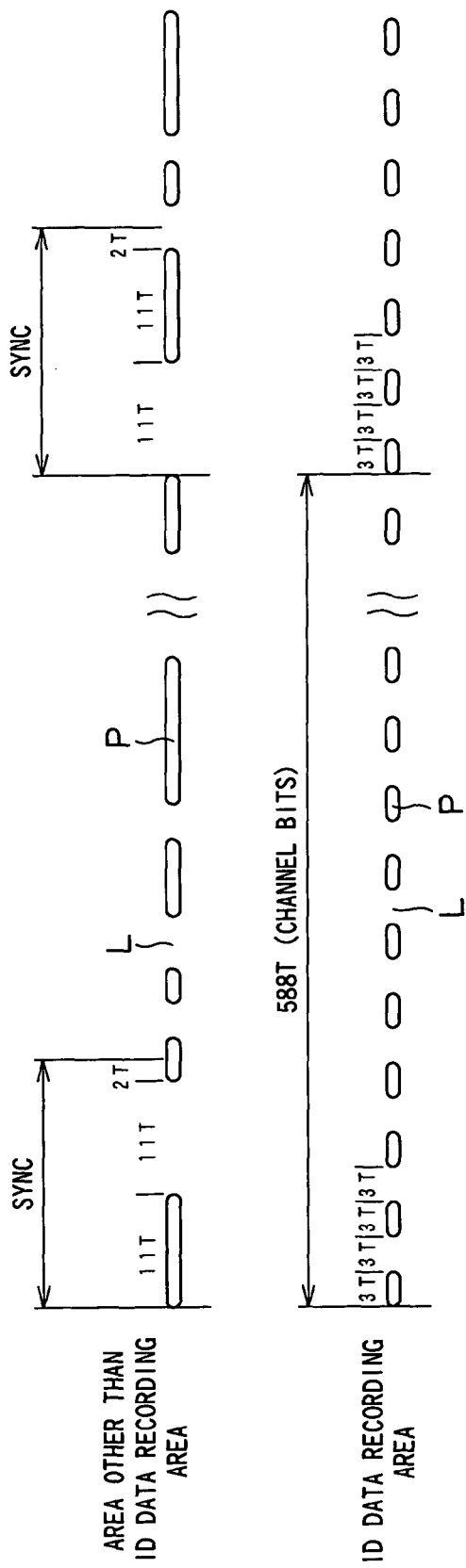
FIG. 7 explains the identification data recording area and other areas.

Here, the optical disc 1 (11) having the identification data recording area 5 (14) provided thereon will specifically be described with reference to FIG. 7. As shown, the identification data recording area 5 in the lead-in area 2 of the optical disc 1 or the identification data recording area 14 in the lead-in area 13a of the optical disc 11 has provided therein a pit pattern defined by pits P of 3T and lands L of 3T formed alternately and repeatedly. In the identification data recording area 5 (14), unique identification data is thermally recorded by laser light in the reflective layer formed on the recording track or between the recording tracks. A pattern of EFM-modulated data is recorded before and after the identification data recording area 5 (14).

Figure 8:
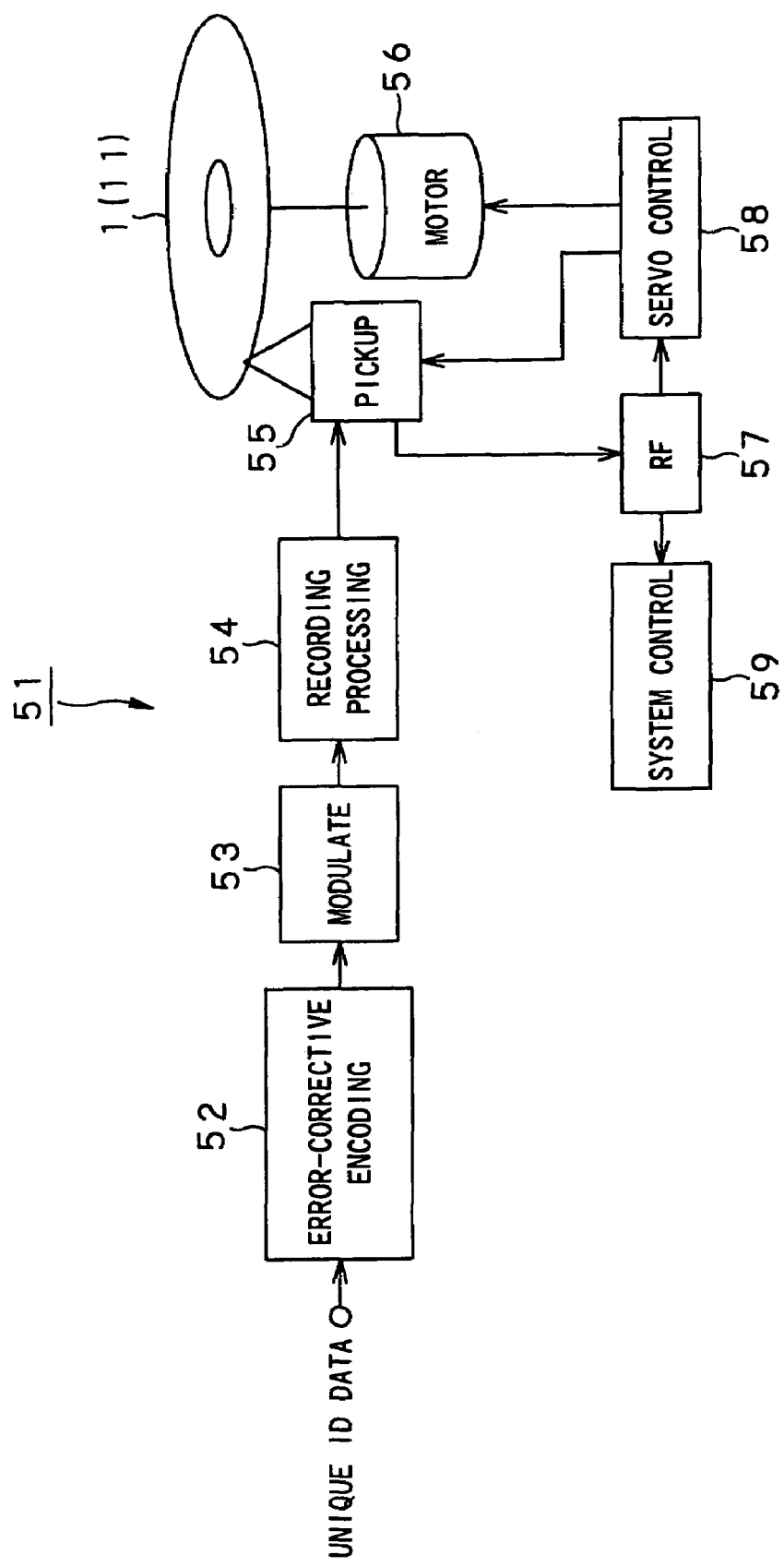
FIG. 8 is a block diagram of a recorder to record identification data to the identification data recording area.

The aforementioned optical disc 1 (11) will have unique identification data recorded in the identification data recording area 5 (14) thereof by a record company or music company for example. Here, a data recorder 51 to record unique identification data to the identification data recording area 5 (14) of the optical disc 1 (11) manufactured as having been described above will be described with reference to FIG. 8.

The data recorder is generally indicated with a reference 51. As shown, the data recorder 51 includes an error-corrective encoder 52, a modulator 53 to modulate unique identification data encoded for error correction, a recording processor 54 to processing signals for recording to the optical disc 1 (11), an optical pickup 55 to thermally record unique identification data by projecting a laser beam to the optical disc 1 (11), a motor 56 to rotate the optical disc 1 (11) at a CLV (constant linear velocity) for example, an RF amplifier 57 to produce RF signal or the like, a servo controller 58 to control the optical pickup 55 for focusing and tracking and the motor 56 for rotation, and a system controller 59 to control the whole data recorder 51 for recording unique identification data to the identification data recording data 5 (14).

The error-corrective encoder 52 encodes unique identification data for error correction and supplies the data to the modulator 53. The modulator 53 modules data supplied from the error-corrective encoder 52. More specifically, the modulator 53 makes phase encoding (PE). That is, the modulator 53 modulates input data such that when the input data is "1", the bit center of the modulated data will rise, when the input data is "0", the bit center of the modulated data will fall and when the same code repeats, the modulated data will be inverted again at a bit boundary, as shown in FIG. 9A.

Note that the modulator 53 may be adapted to make biphase-mark encoding of input data. That is, the modulator 53 modulates input data "1" to "01" or "10" and input data "0" to "00" or "11" as shown in FIG. 9B. Either "01" or "10" or either "00" or "11" is selected as follows. When a preceding modulated data is "1", "01" or "00" is selected. When the preceding modulated data is "0", "10" or "11" is selected.

Thus, having modulated identification data supplied from the error-corrective encoder 53 by PE or biphase-mark encoding, the modulator 53 supplies the modulated unique identification data to the recording processor 54. The recording processor 54 makes recording processing of the modified unique identification data supplied from the modulator 53 and supplies the data to the optical pickup 55.

The optical pickup 55 includes a semiconductor laser to emit a light beam, an objective lens to collect and focus the light beam emitted from the semiconductor laser, a photodetector to detect a reflected light beam from the reflective layer of the optical disc 1 (11), etc. It should be noted that when writing identification data, the semiconductor laser emits a light beam having a higher level than that for reading so that data can be thermally recorded in the reflective layer of the optical disc 1 (11). For example, when recording data "1", the optical pickup 55 will project a high-power light beam to the identification data recording area 5 (14), but when recording data "0", it will not project such a high-power light beam to the identification data recording area 5 (14). The reflected light beam from the signal recording surface of the optical disc 1 (11) is photoelectrically converted by the photodetector. A signal output from the photodetector is supplied to the RF amplifier 57. The objective lens is supported by an objective lens drive mechanism such as a biaxial actuator or the like and is moved in a focusing direction parallel to the optical axis of the objective lens and in a tracking direction orthogonal to the optical axis of the objective lens. The motor 56 rotates the optical disc 1 (11) at a CLV when recording unique identification data to the optical disc 1 (11).

The RF amplifier 57 produces an RF signal, focus error signal and tracking error signal based on a signal output from the photodetector included in the optical pickup 55. For example, the focus error signal is produced by the so-called astigmatic method, while the tracking error signal is produced by the so-called three-beam method or push-pull method. The RF amplifier 57 supplies the RF signal to the system controller 59 in order to extract address information or the like, and focus error signal and tracking error signal to the servo controller 58. That is, when recording unique identification data, a pit pattern defined by pits and lands of 3T and 3T' provided in the identification data recording area 5 (14) is used to produce only a focusing servo signal and tracking servo signal for the laser light intended for recording the identification data as above, namely, to guide the light beam.

The servo controller 58 produces a servo signal for recording unique identification data to the optical disc 1 (11). More particularly, the servo controller 58 produces a focusing servo signal based on a focus error signal, and a tracking servo signal based on a tracking error signal. The servo controller 58 supplies the focusing and tracking servo signals to a drive circuit in the objective lens drive mechanism included in the optical pickup 55. The drive circuit moves the objective lens in a focusing direction parallel to the optical axis of the objective lens based on the focusing servo signal, and in a tracking direction orthogonal to the optical axis of the objective lens based on the tracking servo signal.

The servo controller 58 is supplied with a clock signal or the like for controlling the motor 56 to rotate the optical disc 1 (11) at a CLV. When reading data from any area other than the identification data recording area 5 (14), the servo controller 58 provides a coarse rotation servo control until the PLL (phase-locked loop) is locked. Then, it will provide a normal rotation servo control. Specifically, when reading data from any area other than the identification data recording area 5 (14), the servo controller 58 will detect a maximum interval of inversion from maximum and minimum values of a signal pulse at the start of rotation or the like and implements, taking the detected maximum interval of inversion as a frame sync signal (11T and 11T'), such a coarse rotation control that a reference length of time coincides with the maximum interval of inversion. Once the PLL is locked, the servo controller 58 makes a normal rotation servo control, that is, a rotation servo control of the motor 56 using a result of comparison in phase between a clock signal extracted from the RF signal or the like and a reference clock signal. The servo controller 58 can identify the identification data recording data 5 (14) by reading TOC data such as address information or the like from the lead-in area of the optical disc 1 (11) by means of the optical pickup 5.

When recording unique identification data to the identification data recording area 5 (14), however, the servo controller 58 cannot detect any sync signal by the same method as for the areas other than the identification data recording area 5 (14) because the pit pattern of pits and lands 3T and 3T' is provided in the identification data recording area 5 (14). More specifically, when there is done the aforementioned rotation servo control effected for any area other than the identification data recording area 5 (14) based on a frame sync signal, the servo controller 58 will take the pit pattern of pits and lands of 3T and 3T' as the pit pattern of pits and lands of 11T and 11T' and thus the rotation velocity will be 3 to 4 times slower than the normal rotation velocity. To avoid this, when recording unique identification data to the identification data recording area 5 (14), the servo controller 58 will detect an interval of inversion from maximum and minimum pulse widths of a data signal having a predetermined interval between a pit and land of 3T and 3T' for example, and takes the value as a sync signal to provide a coarse rotation servo control. It should be noted that the servo controller 58 may also be adapted to provide a coarse servo control using a free-running frequency, for example.

The system controller 59 extracts sub-code data from an RF signal output from the RF amplifier 57. The system controller 59 identifies the identification data recording area 5 (14) based on the address information or the like, and supplies the servo controller 58 with a switching signal for switching the rotation servo control to the coarse rotation servo control mode when the optical pickup 55 has become ready for recording unique identification data to the identification data recording area 5 (14).

The data recorder 51 constructed as above operates as will be described below:

First, when an operation for recording unique identification data is started, the motor 56 will rotate the optical disc 1 (11). At this time, the servo controller 58 detects a maximum interval of inversion from maximum and minimum pulse widths of the data signal and takes the value as a frame sync signal (11T and 11T') or uses a free-running frequency to make a coarse rotation servo control of the motor 56 until the PLL can be locked. Once the PLL is locked, the servo controller 58 controls the motor 56 in the normal rotation servo control mode that is based on a result of comparison in phase between a clock signal extracted from the RF signal and a reference clock signal. The RF amplifier 57 produces an RF signal, focus error signal and tracking error signal, and supplies the RF signal to the system controller 59 and the focus error signal and tracking error signal to the servo controller 58. The servo controller 58 produces a focusing servo signal and tracking servo signal based on the supplied focusing and tracking error signals, and supplies the signals to the objective lens drive circuit. Thus, the objective lens in the optical pickup 55 is moved in the focusing and tracking directions, so that the laser light will scan a recording track defined by a plurality of pits formed on the optical disc 1 (11), following an axial deflection (vertical move) and radial runout (eccentricity) of the optical disc 1 (11).

The optical pickup 55 starts reading data from the inner-circumference side of the optical disc 1 (11), and the system controller 59 extracts sub-code data from the RF signal to position of the identification data recording area 5 (14) based on the address information, as shown in FIG. 10. In step S11, the system controller 59 determines, based on the sub-code data such as address information, whether or not a position being currently accessed, that is, a position being scanned by the optical pickup 55, is a position just before the identification data recording area 5 (14), where the rotation servo control on the motor 56 should be switched. When the system controller 59 has determined that the position is a one for switching the rotation servo control, it goes to step S12. On the contrary, when it determines that the position is not so, it will go back to and-repeat step S11.

When the system controller 59 has determined in step S11 that the position is a one for switching the rotation servo control, it goes to step S12 where it will supply the servo controller 58 with a switching signal to switch the rotation servo control to a coarse mode and the servo controller 58 will thus be switched according to the supplied switching signal to the coarse rotation servo control mode when the light beam comes to just before the identification data recording area 5 (14) and drive the motor 56 in the coarse rotation servo control mode. It should be noted that the data recorder may be adapted to switch the rotation servo control at a time when the optical pickup 55 accesses the identification data recording area 5 (14). More specifically, the servo controller 58 detects an interval of inversion from maximum and minimum pulse widths of a data signal having a predetermined period between pits in a pit pattern defined by pits and lands of 3T and 3T' formed alternately and repeatedly and provided in the identification data recording area 5 (14) and takes the detected inversion interval as a sync signal to make the rotation control of the motor 56. This is because the unique identification data recording area 5 (14) has formed therein a pit pattern of lands and pits of 3T and 3T' and thus it is not possible to provide the rotation servo control which is bade on the normal frame sync signal.

On the other hand, unique identification data is encoded for error correction by the error-corrective encoder 52, and phase- or biphase-encoded by the modulator 53 for recording by the recording processor 54. The optical pickup 55 switches its light beam output to a higher level than the standard level for reading before recording unique identification data to the identification data recording area 5 (14). More specifically, the optical pickup 55 will project laser light as a high-power light beam to the identification data recording area 5 (14) when recording "1" to the identification data recording area 5 (14), while projecting a light beam having a standard output level intended for reading, for example, lower the high output level, to the identification data recording area 5 (14) when recording "0". Thereby, the reflective layer in the identification data recording area 5 (14) of the optical disc 1 (11) will be varied to thermally record unique identification data there.

Figure 11:
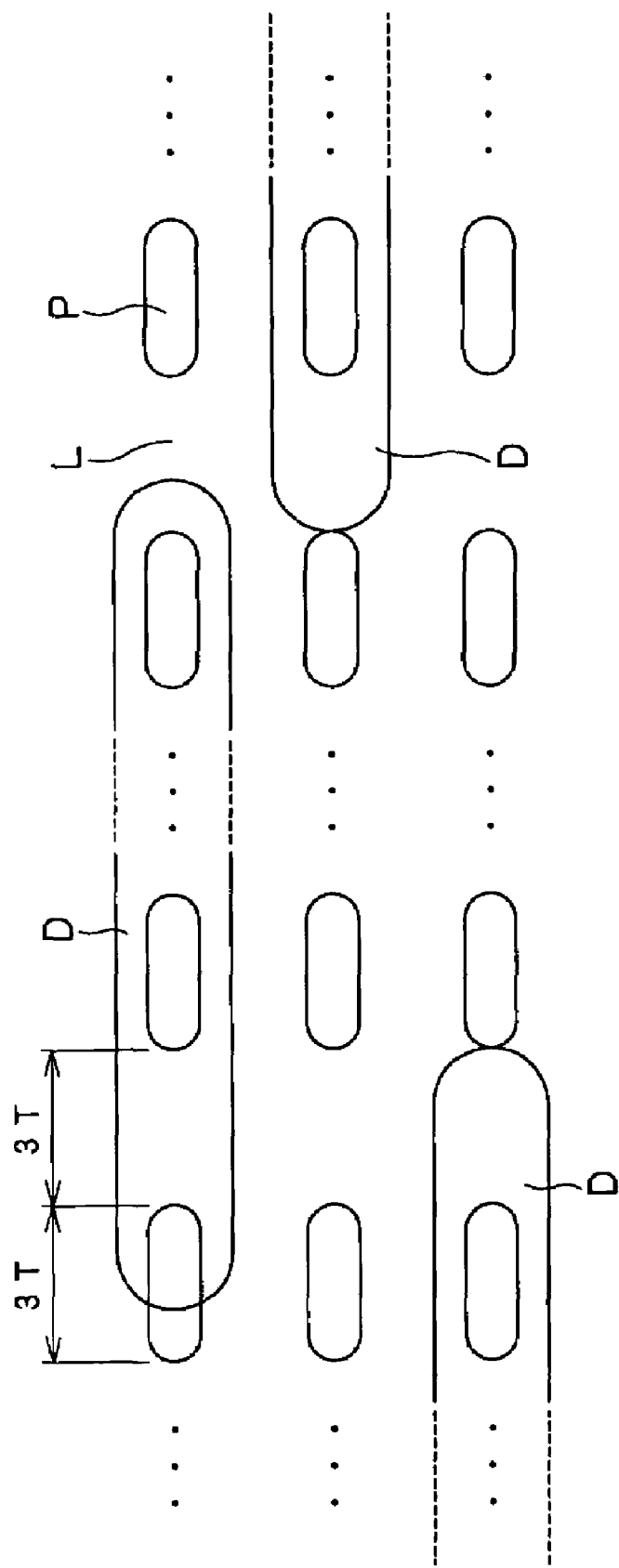
FIG. 11 explains the recorded state of unique identification data in the identification data recording area.

Thus, the identification data recording area 5 (14) will have unique identification data D of 2T, 3T, 98T or the like in bit length recorded on the pit pattern of pits P and lands L of 3T, respectively, formed alternately and repeatedly, as shown in FIG. 11. The length per bit of the identification data D should preferably be long and more preferably be 98T to permit stable reading of unique identification data. Also, as unique identification data having a pattern of pit and lands of 98T, respectively, is recorded on a pit pattern defined by pits and lands of 3T and 3T' formed alternately and repeatedly with a frequency as low as 98T, it can stably be read. It should be noted that in the example shown in FIG. 11, unique identification data D is recorded on a recording track formed from pits P and lands L but the unique identification data may be recorded between such recording tracks. In the example shown in FIG. 11, the data D is formed to include the pits P and lands L, but unique identification data D may be recorded by projecting the lands L with laser light having a high output level to metamorphose the reflective layer for more than two pits P to be repeated continuously.

The optical disc 1 (11) constructed as above has unique identification data recorded on a pit pattern defined by pits and lands of 3T and 3T' formed alternately and repeatedly to prevent any data player not compatible with the normal identification data recording area 5 (14). Therefore, when reading data from the identification data recording area 5 (14) of the optical disc 1 (11) by any player other than the dedicated player, no frame sync signal will be available in the identification data recording area 5 (14), and so no rotation servo control can be made on the motor 56 and thus it is possible to prevent unique identification data from being read illegally.

For recording unique identification data for the optical disc 1 (11), the data recorder 51 can positively record the unique identification data to an area, where no frame sync signals of 11T and 11T' are provided as in the identification data recording area 5 (14), by making the normal rotation servo control using the PLL for accessing an area other than the identification data recording area 5 (14), while switching the rotation servo control to the coarse rotation servo control mode for accessing the identification data recording area 4 (15).

Since the optical disc 1 (11) has unique identification data thermally recorded on the pit pattern of pits P and lands L of 3T and 3T' provided in the identification data recording area 5 (14), the identification data will not be copied when a pit pattern provided on a disc substrate is illegally stamped. For example, even when a new illegal stamper is made based on the disc substrate of the optical disc 1 (11) and a new disc substrate is molded using the illegal stamper, the identification data recorded later by the aforementioned method will not be stamped on the new disc substrate.

Figure 12:
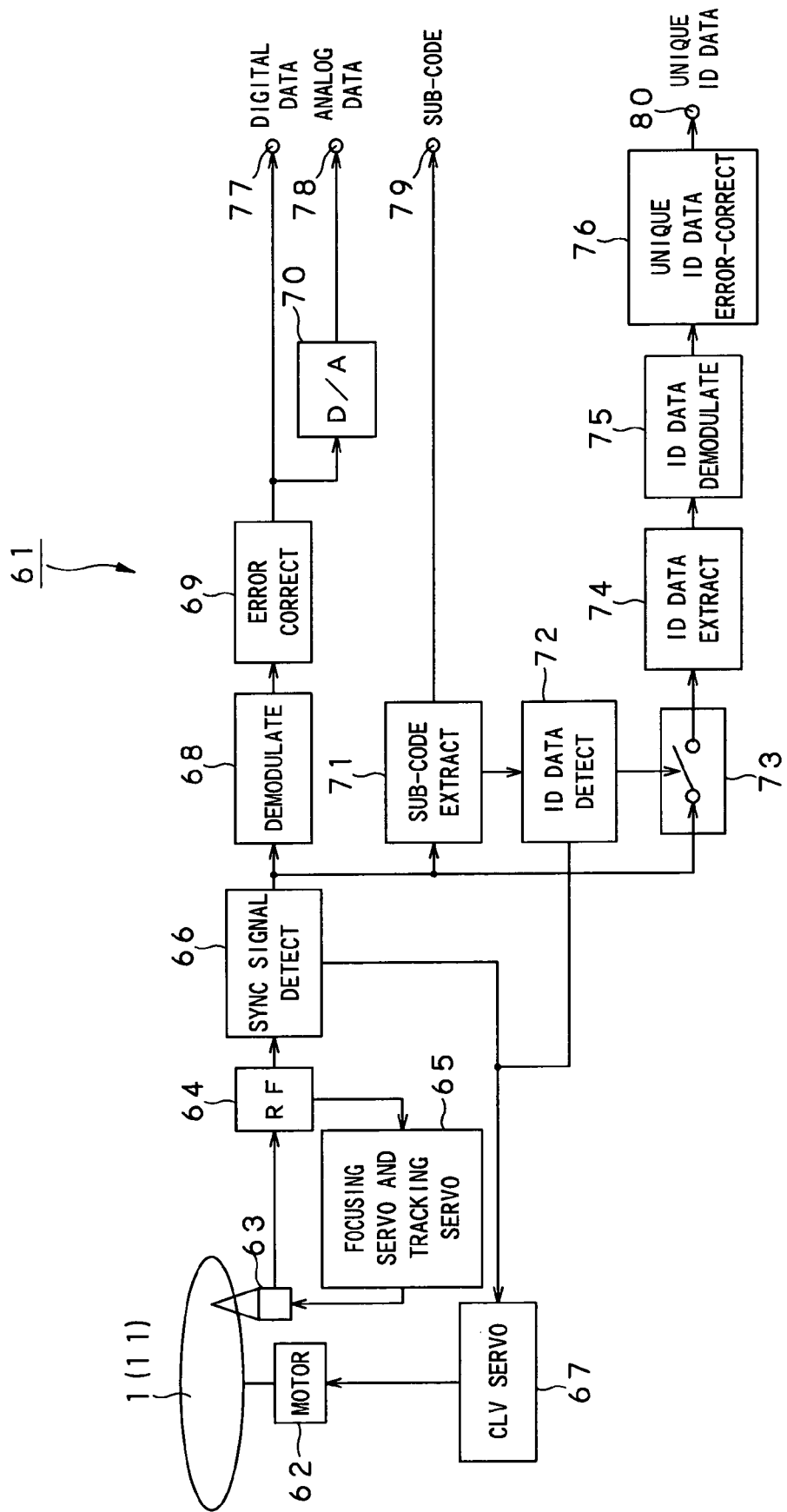
FIG. 12 is a block diagram of the data player according to the present invention.

Next, a data player for the optical disc 1 (11) having unique identification data, recorded therein as having previously been described will be described with reference to FIG. 12. The data player is generally indicated with a reference 61. As shown, the data player 61 includes a spindle motor 62 as a disc drive unit to rotate the optical disc 1 (11), an optical pickup 63 to project a light beam to the optical disc 1 (11) being rotated by the spindle motor 62 and read data by detecting a reflected light beam from the optical disc 1 (11), an RF amplifier 64 to amplifier a signal output from the optical pickup 63, a servo controller 65 to make focusing and tracking servo control, a sync signal detector 66 to detect sync signal from a signal output from the RF amplifier 64, a rotation servo controller 67 to control the rotation of the spindle motor 62 based on the sync signal detected by the sync signal detector 66, a demodulator 68 to demodulate an RF signal output from the RF amplifier 64, an error-corrective processor 69 to detect error of a demodulated data output from the demodulator 68 and correct the error, a D-A converter 70 to convert a digital signal output from the error-corrective processor 69 into an analog signal, and a sub-code extraction unit 71 to extract sub-code such as address information or the like from the RF signal output from the RF amplifier 64.

The data player 61 further includes an identification data detector 72 to detect address information on the identification data recording area 5 (14) from the sub-code data such as address information extracted by the sub-code extraction unit 71, a selection switch 73 to control outputting of unique identification data, an identification data extraction unit 74 to extract unique identification data, an identification data demodulator 75 to demodulate unique identification data extracted by the identification data extraction unit 74, and an identification data error-corrective processor 76 to detect error of demodulated unique identification data and correct the error.

The spindle motor 62 rotates, at a CLV for example, the optical disc 1 (11) set on a disc holder formed from a disc table and the like and installed on the rotation shaft of the spindle motor 62. The optical pickup 63 includes a semiconductor laser as a light source to emit a light beam, an objective lens to focus the light beam emitted from the semiconductor laser, a photodetector to detect a reflected light beam from the optical disc 1 (11) and the like. A light beam emitted from the semiconductor laser is focused by the objective lens on the signal recording surface of the optical disc 1 (11). The "signal recording surface" refers to a surface of the optical disc 1 (11) on which a pit pattern is formed. A reflected light beam from the reflective layer of the optical disc 1 (11) is detected and photoelectrically converted by the photodetector, and an electrical signal thus produced by the photodetector is supplied as a detection output signal to the RF amplifier 64. The objective lens is supported by an objective lens drive mechanism such as an actuator and the like (not shown) and moved in a focusing direction parallel to the optical axis of the objective lens according to a focusing servo signal supplied from the servo controller 65, as will further be described later, and in a tracking direction orthogonal to the optical axis of the objective lens according to a tracking servo signal also supplied from the servo controller 65. The optical pickup 63 is moved radially of the optical disc 1 (11) by a feeding mechanism (not shown).

The RF amplifier 64 produces an RF signal, focus and tracking error signals based on a signal output from the photodetector in the optical pickup 63. For example, the focus error signal is produced by the so-called astigmatic method, while the tracking error signal is produced by the so-called three-beam method or push-pull method. The RF amplifier 64 supplies an RF signal to the sync signal detector 66 and each of the error signals to the servo controller 65.

The servo controller 65 produces a servo signal used to read data from the optical disc 1 (11). More particularly, the servo controller 65 produces a focusing servo signal based on a focus error signal supplied from the RF amplifier 64 and a tracking servo signal based on a tracking error signal also supplied from the RF amplifier 64. The servo controller 65 supplies the focusing and tracking servo signals to the objective lens drive mechanism of the optical pickup 63. The objective lens mechanism moves the objective lens in a focusing direction parallel to the optical axis of the objective lens according to the supplied focusing servo signal, and in a tracking direction orthogonal to the optical axis of the objective lens according to the supplied tracking servo signal. As a result, the laser light focused by the objective lens will correctly scan the recording track on the optical disc 1 (11) following an axial deflection and radial-runout of the optical disc 1 (11).

The sync signal detector 66 detects a sync signal in a frame from the RF signal. In an area other than the identification data recording area 5 (14), the sync signal is a pattern of 11T and 11T' not existing in any EFM modulation pattern. Therefore, the sync signal detector 66 will detect a maximum interval of inversion from maximum and minimum pulse widths of the data signal, takes the detected maximum interval of inversion as a frame sync signal (11T and 11T') and supplies it to the rotation servo controller 67.

When reading unique identification data from the identification data recording area 5 (14), the sync signal detector 66 detects an interval of inversion from maximum and minimum pulse widths of a data signal having a predetermined period between pits in a pit pattern of pits P and lands L of 3T, takes the detected period of inversion as a sync signal, and supplies it to the rotation servo signal 67.

The rotation servo controller 67 is supplied with a clock signal or the like to control the spindle motor 62 for rotation of the optical disc 1 (11) at a CLV. For reading data from an area other than the identification data recording area 5 (14), the rotation servo controller 67 makes a coarse rotation servo control until the PLL (phase-locked loop) is locked. Once the PLL is locked, the rotation servo controller 67 will make the normal rotation servo control that is based on the result of comparison in phase between the clock signal extracted from the RF signal and a reference clock signal. In the coarse rotation servo control, the rotation servo controller 67 provides such a control that the reference length of time coincides with the maximum interval of inversion of the frame sync signal, and the PLL is locked.

When reading unique identification data from the identification data recording area 5 (14), however, the rotation servo controller 67 cannot detect any sync signal in the same manner as the data reading from the other area because the identification data recording area 5 (14) has provided therein a pit pattern of pits P and lands L of 3T and 3T' formed alternately and repeatedly. That is, if the rotation servo controller 67 makes a rotation servo control with the aforementioned frame sync signal, effected for an area other than the identification data recording area 5 (14), it will take a pattern of 3T and 3T' as a pattern of 11T and 11T' and thus the optical disc 1 (11) will be rotated at a velocity 3 to 4 times slower than normal. When reading unique identification data from the identification data recording area 5 (14), the rotation servo controller 67 will detect an interval of inversion from maximum and minimum pulse widths of a data signal having a predetermined period between pits in a pit pattern of pits P and lands L of 3T and 3T' for example and provide such a control that the reference length of time coincides with the detected interval of inversion. It should be noted that the rotation servo controller 67 may other be adapted to make a coarse servo control with a free-running frequency, for example.

The demodulator 68 demodulates the EFM-processed data read from the area other than the identification data recording area 5 (14), and supplies the data to the error-corrective processor 69. The error-corrective processor 69 makes error correction of the data output from the demodulator 68 according to an error correction code such as CIRC or the like. Digital signal output from the error-corrective processor 69 is delivered at an output terminal 77, and also supplied to the D-A converter 70. The D-A converter 70 converts the supplied digital signal into an analog signal, and supplies the data from an output terminal 78 to which a speaker, earphone, headphone, monitor or the like is connected to outside the data player 61. The data read from the optical disc 1 (11) is delivered as a digital signal at the output terminal 77 or as an analog signal at the output terminal 78, namely, in at least either of the signal forms, digital or analog.

The sub-code extraction unit 71 extracts sub-code data from the RF signal output from the RF amplifier 64, and delivers the extracted sub-code data at an output terminal 79.

The identification data detector 72 detects address information on the identification data recording area 5 (14) from address information as the sub-code data extracted by the sub-code extraction unit 71. When reading unique identification data from the identification data recording area 5 (14), the selection switch 73 is turned on to enable the identification data extraction unit 74 to extract unique identification data. On the contrary, when reading data from an area other than the identification data recording area 5 (14), the selection switch 73 is turned off.

The identification data demodulator 75 demodulates the phase- or biphase mark-encoded unique identification data and supplies the data to the identification data error-corrective processor 76. The identification data error-corrective processor 76 detects an error of the unique identification data and corrects the error, and delivers at an output terminal 80.

Note that the data player 61 is provided with a controller (not shown). The controller controls the operation of the data player 61 and is supplied with sub-code data, unique identification data, etc.

Figure 13:
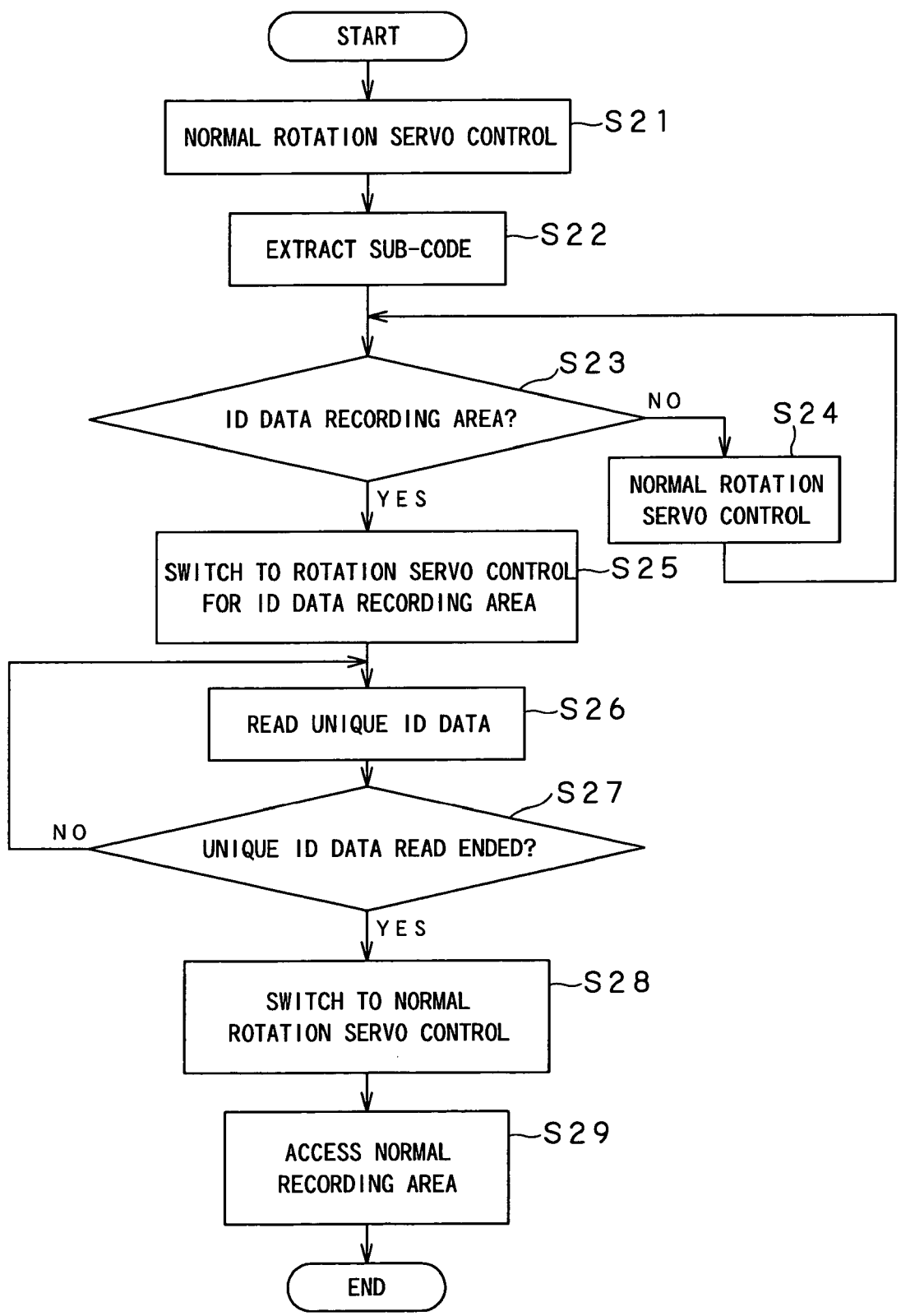
FIG. 13 shows a flow of operations of the data player according to the present invention.

The data player 61 constructed as above operates as will be described below with reference to FIG. 13:

In step S21, when the optical disc 1 (11) is set in the disc holder, the controller of the data player 61 puts the spindle motor 62 into operation to rotate the optical disc 1 (11) while controlling a feeding mechanism (not shown) to move the optical pickup 63 to the inner circumference of the optical disc 1 (11), thereby setting up a ready state for reading TOC data from the lead-in area 2 (12*a*). It should be noted here that when the optical disc 1 (11) is put into rotation, the sync signal detector 66 detects a maximum interval of inversion from maximum and minimum pulse widths of data signal, extracts frame sync signal of 11T and 11T', and supplies the signals to the rotation servo controller 67. The rotation servo controller 67 will first provide, according to the supplied frame sync signals, such a coarse rotation servo control that the reference length of time coincides with the maximum interval of inversion until the PLL is locked. Once the PLL is locked, the rotation servo controller 67 will provide normal rotation servo control for rotation of the optical disc 1 (11) at a CLV (constant linear velocity). In step S22, the optical pickup 63 detects a reflected light beam from the optical disc 1 (11) by means of the photodetector, the detected light beam is photoelectrically converted by the photodetector, and a signal output of the photodetector is supplied as a detection signal to the RF amplifier 64. The sub-code extraction unit 71 extracts sub-code data such as address information or the like. With such a sub-code data being extracted, the controller of the data player 61 can acquire address information on the optical disc 1 (11) set in the disc holder.

In step S23, the identification data detector 72 acquires, from the address information, information on a position of the identification data recording area 5 (14) on the optical disc 1 (11), that is, address information on the identification data recording area 5 (14). Then, the identification data detector 72 determines whether a position currently scanned or accessed by the optical pickup 63 is a position of switching the rotation servo of the spindle motor 62, just before the identification data recording area 5 (14). When the controller of the data player 61 determines, based on data indicating the result of determination by the identification data detector 72, that the position currently accessed by the optical pickup 63 is not the position of switching the rotation servo of the spindle motor 62, it will go to step S24. On the contrary, when the result of the determination made by the controller based on the result of determination from the identification data detector 72 is that the currently accessed position is the position of switching the rotation servo of the spindle motor 62, the controller will go to step S25.

If the identification data detector 72 has determined in step S23 that the currently accessed position is not the position of switching the rotation servo of the spindle motor 62, it means that an area other than the identification data recording area 5 (14) is being accessed. In this case, the controller will make, in step S24, rotation servo control of the spindle motor 62 with the PLL being locked, and then go back to step S23.

In case it has been determined in step S23 by the identification data detector 72 that the currently accessed position is the position of switching the rotation servo of the spindle motor 62, the controller supplies, in step S25, a rotation servo switching signal to the rotation servo controller 67 to switch the servo control. That is to say, the sync signal detector 66 detects a maximum interval of inversion from maximum and minimum pulse widths of a signal having a predetermined period in a pit pattern of pits P and lands L of 3T and 3T' formed alternately and repeatedly, and supplies the detected interval of inversion as a sync signal to the rotation servo controller 67. As a result, the rotation servo controller 67 makes such a coarse rotation servo control of the spindle motor 62 that the interval of inversion of the sync signal coincides with the reference length of time. Simultaneously, the identification data detector 72 turns on the selection switch 73 to set up a ready state in which the identification data extraction unit 74 is enabled to extract unique identification data from a signal read by the optical pickup 63. It should be noted that the rotation servo may be switched when the optical pickup 63 accesses the identification data recording area 5 (14).

In step S26, the optical pickup 63 makes focusing servo control and tracking servo control with a pit pattern of 3T and 3T' in the identification data recording area 5 (14) and reads unique identification data recorded on a pit pattern of 3T and 3T' or between recording tracks each formed from the pit pattern of 3T and 3T'. Since unique identification data is recorded in a length of 98T per bit as previously described, so it can satisfactorily be read under the coarse rotation servo control. The identification data extraction unit 74 extracts unique identification data from supplied RF signal and supplies the data to the identification data demodulator 75. The identification data demodulator 75 demodulates the supplied unique identification data having been phase-encoded (PE) or biphase mark-encoded, and supplies the data to the identification data error-corrective processor 76. The identification data error-corrective processor 76 makes error-corrective processing of the unique identification data supplied from the demodulator 75, and then delivers the data at the output terminal 80. The unique identification data delivered at the output terminal 80 is supplied to the controller.

In step S27, the identification data detector 72 determines whether the unique identification data has completely been read from the optical disc 1 (11). More particularly, for determining whether the unique identification data has completely been read from the identification data recording area 5 (14), the identification data detector 72 determines, based on the address information in the sub-code data extracted by the sub-code extraction unit 71, whether or not a position scanned by the optical pickup 63 has reached the last address in the identification data recording area 5 (14). Having determined that the reading of the identification data from the identification data recording area 5 (14) is complete, the identification data detector 72 will go to step S28. On the contrary, if the identification data detector 72 has determined that the reading of the identification data from the identification data recording area 5 (14) is not yet complete, it will go back to step S26.

In step S28, the controller will supply, based on the result of detection from the identification data detector 72 or 74, a switching signal to the rotation servo controller 67 to switch the control mode from the rotation servo control by the rotation servo controller 67 back to the normal rotation servo control. According to the frame sync signal supplied from the sync signal detector 66, the rotation servo controller 67 makes rotation servo control of the spindle motor 62 with the PLL being locked. In step S29, the optical pickup 63 is moved by the feeding mechanism (not shown) radially thereof to an area other than the identification data recording area 5 (14) to read data from the program area 3 (12*b* or 13*b*). Namely, when reading data from the program area 3 of the optical disc 1 or from the first session 12 or second session 13 of the optical disc 11, an RF signal is supplied from the RF amplifier 64 to the demodulator 68. The demodulator 68 demodulates EFM-processed data from the supplied RF signal, and supplies the data to the error-corrective processor 69. The error-corrective processor 69 detects an error and corrects the error, according to an error correction code which as been added to the demodulated data, and supplies the error-corrected digital signal to the D-A converter 70 or delivers the digital signal as it is at the output terminal 78. The D-A converter 70 converts the digital signal supplied from the error-corrective processor 69 into an analog signal, and delivers the analog signal at the output terminal 77.

As above, in the data player 61, for accessing an area other than the identification data recording area 5 (14), the normal rotation servo control is effected using the PLL, while the coarser rotation servo control than the normal one is effected for accessing the identification data recording area 5 (14), thereby permitting to read unique identification data from an area where no frame sync signal of 11T and 11T' are provided like the identification data recording area 5 (14).

Figure 14:
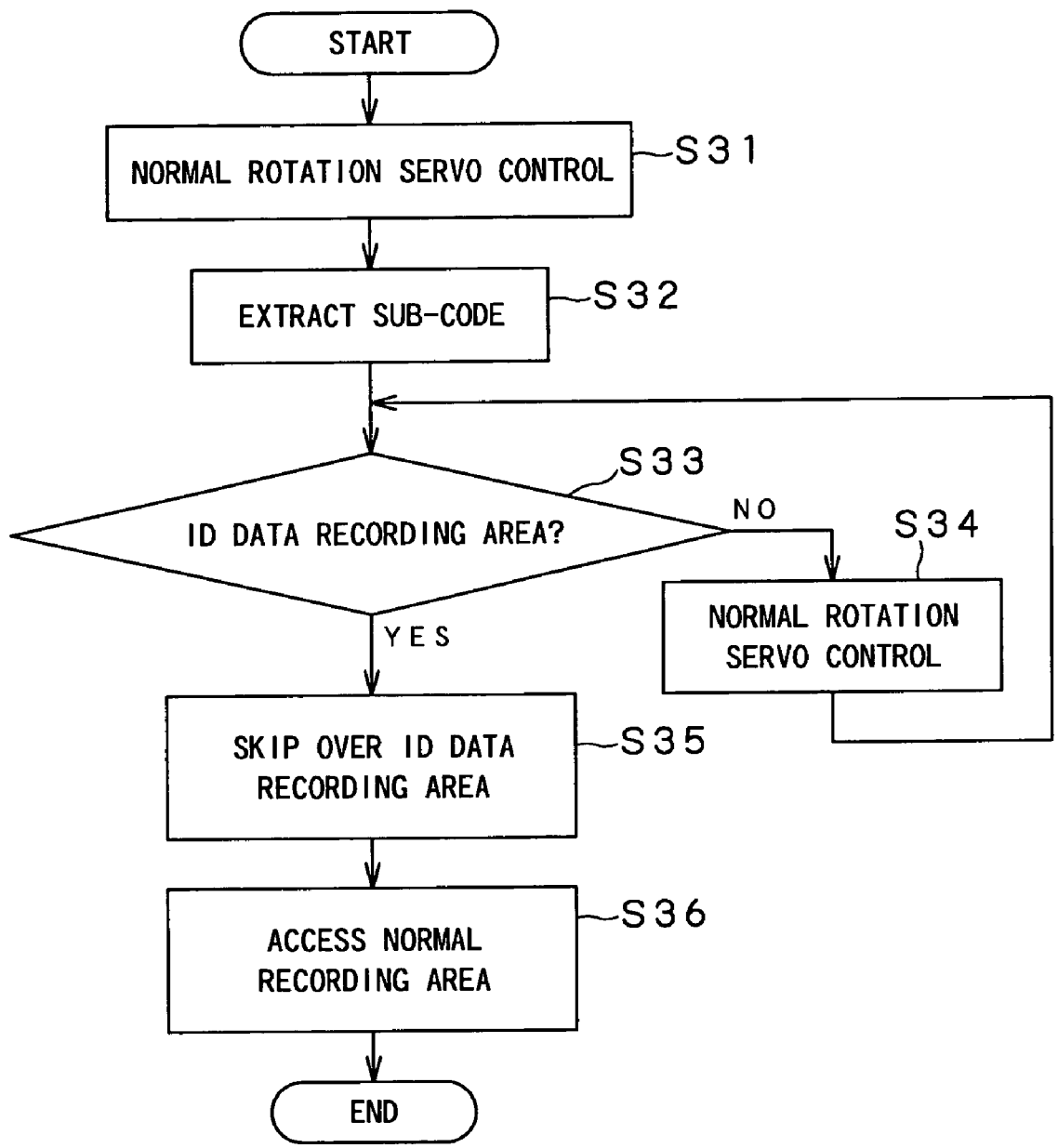
FIG. 14 shows a flow of operations made in skipping over the identification data recording area.

Once the data player 61 has read unique identification data from the optical disc 1 (11) and saved it in an internal memory thereof (not shown), it will have not to read any unique identification data for second and subsequent reading operations. In such an event, data may be read by skipping over the identification data recording area 5 (14) on the optical disc 1 (11), as shown in FIG. 14.

That is, in step S31, in the data player 61, when the optical disc 1 (11) is set in the disc holder (not shown), the spindle motor 62 is put into operation to rotate the optical disc 1 (11) while the optical pickup 63 is moved to the inner circumference of the optical disc 1 (11) to project a light beam to the optical disc 1 (11) in order to read TOC data. Then, the sync signal detector 66 will detect, at the start of rotation of the optical disc 1 (11), a maximum interval of inversion from maximum and minimum pulse widths of a signal, extract a frame sync signal of 11T and 11T' from the detected maximum interval of inversion, and supplies the frame sync signal to the rotation servo controller 67. The rotation servo controller 67 will first make such a coarse rotation servo control that the reference length of time will coincide with the maximum interval of inversion of the frame sync signal. When the PLL is locked, the rotation servo controller 67 will make the normal rotation servo control that is based on a difference in phase between a clock signal detected from an RF signal and reference clock signal as mentioned above to rotate the optical disc 1 (11) at a CLV. In step S32, the optical pickup 63 detects a return light beam from the optical disc 1 (11) by means of the photodetector, converts the detected light beam photoelectrically, and supplies an output signal from the photodetector to the RF amplifier 64. The sub-code detector 71 extracts a sub-code data such as address information or the like from the supplied RF signal. Thereby, the data player 61 can acquire the address information on the optical disc 1 (11) set in the disc holder.

In step S33, the identification data detector 72 acquires a position, on the optical disc 1 (11), of the identification data recording area 5 (14), namely, address information on the identification data recording area 5 (14), according to the supplied address information. The identification data detector 72 determines, based on the address information as sub-code data, whether or not a position being currently being accessed by the optical pickup 63 is a position just before the identification data recording area 5 (14) where the rotation servo control of the spindle motor 62 should be switched. When the controller of the data player 61 has determined based on data indicative of the result of determination supplied from the identification data detector 72 that the position being currently accessed is not any position of switching the rotation servo control on the spindle motor 62, it will go to step S34. On the contrary, when the controller has determined, according to the data indicative of the result of determination from the identification data detector 72, that the position being currently accessed is just the position of switching the rotation, servo control on the spindle motor 62, it will go to step S35.

If the identification data detector 72 has determined, in step S34, that the position being currently accessed in not the position of switching the rotation servo control on the spindle motor 62, it means that an area other than the identification data recording area 5 (14) is being accessed. In this case, the controller will make, in step S34, a rotation servo control of the spindle motor 62 with the PLL being locked, and then go back to step S33.

When the identification data detector 72 has determined in step S34 that the position being currently accessed is just the position of switching the rotation servo control on the spindle motor 62, the controller of the data player 61 will control, in step S35, the feeding mechanism (not shown) to feed the optical pickup 63 to the outer circumference of the identification data recording area 5 (14) of the optical disc 1 (11) so as to skip over the identification data recording area 5 (14). In step S36, the optical pickup 63 will access an area other than the identification data recording area 5 (14) and read data from the program area 3 (12*b* or 13*b*). That is, for reading data from the program area 3 of the optical disc 1 or the first or second session 12 or 13 of the optical disc 11, an RF signal is supplied from the RF amplifier 64 to the demodulator 68. The demodulator 68 demodulates EFM-processed data from the supplied RF signal, and supplies it to the error-corrective processor 69. The error-corrective processor 69 detects an error and corrects it, according to an error correction code having been added to the demodulated data supplied from the demodulator 68, and supplies the error-corrected digital signal to the D-A converter 70 or delivers;the digital signal as it is at the output terminal 78. The D-A converter 70 converts the digital signal supplied from the error-corrective processor 69 into an analog signal, and delivers the analog signal at the output terminal 77.

As above, for reading data from the optical disc 1 (11) at second and subsequent times, the data player 61 reads data by skipping over the identification data recording area 5 (14). That is, it is not necessary to switch the rotation servo control and thus the time taken until reading of content data is started can be reduced.

In the foregoing, the present invention has been described concerning the read-only optical disc 1 (11) having content data recorded in the form of a pit pattern in other than the identification data recording area 5 (14). However, the optical disc used in the present invention may be a recordable or write-once-read many optical disc having grooves formed in the disc substrate thereof in an area other than the identification data recording area 5 (14) and also a die layer as a recording layer formed on the disc substrate, an rewritable optical disc having grooves formed in the disc substrate thereof in an area other than the identification data recording area 5 (14) and also a phase-change material layer as a recording layer on the disc substrate, or the like.

INDUSTRIAL APPLICABILITY

As having been described in the foregoing, according to the present invention, when recording or reading data to or from an optical disc having provided in a first area thereof a pattern modulated by a predetermined modulation method and a sync signal pattern including a pattern as long as, or longer than, the maximum run length in this method and in a second area different from the first area a pattern not included in the sync signal pattern, the data recording or reading from the first area is made by controlling the rotation of a rotation driving means in a high-accuracy first mode using the sync signal pattern and the data recording or reading is made from the second area by controlling the rotation of the rotation driving means in a coarser second mode using the pattern not included in the sync signal pattern. Therefore, according to the present invention, data can positively be recorded to the second area and data can positively read from the second area.

The invention claimed is:
1. An optical disc recorder and/or player, comprising:
a rotation drive unit operable to rotate an optical disc having defined therein a first recording area in which a frame sync signal and data are recorded and a second recording area having a plurality of pits arranged in a pit pattern and having identification data recorded thereon;

a head unit operable to scan the optical disc by projecting a laser beam to the optical disc; and a controller operable to control the rotation drive unit in a first rotation control mode when the head unit scans the first recording area and to control the rotation drive unit in a second rotation control mode when the head unit scans the second recording area, said controller being operable to detect, for the second recording area, an interval of inversion from maximum and minimum pulse widths of a data signal having a predetermined period between the pits in the pit pattern to form a frame sync signal, and to control the rotation drive unit such that the interval of inversion of the frame sync signal coincides with a reference length of time, wherein the first and second recording areas are recording areas distinct from each other.

2. The apparatus as set forth in claim 1, wherein based on identification data read by the head unit from the optical disc, the controller determines which of the first recording area and second recording area the head unit is scanning and makes a selection between the first rotation control mode and second rotation control mode based on a determination result.

3. The apparatus as set forth in claim 2, wherein based on address data read by the head unit from the optical disc, the controller determines whether a position scanned by the head unit is a position just before the second recording area and where a mode of controlling the rotation of the rotation drive unit should be switched, and switches the rotation control mode to the second rotation control mode when a determination result shows that the scanned position is the position just before the second recording area.

4. The apparatus as set forth in claim 3, wherein when the scanned position is a rotation control mode switching position, the controller detects an interval of inversion from an output signal supplied when the predetermined pattern read by the head unit is detected, and controls the rotation drive unit in the second rotation control mode according to the detected interval of inversion.

5. The apparatus as set forth in claim 3, wherein when the scanned position is not a rotation control mode switching position, the controller controls the rotation drive unit in the first rotation control mode.

6. The apparatus as set forth in claim 3, wherein while the rotation drive unit is being controlled in the second rotation control mode, the identification data is recorded to the second recording area taking as a guide the plurality of pits arranged in the pit pattern.

7. The apparatus as set forth in claim 3, wherein when scanning of the unique identification data to the second recording area is complete, the controller controls the rotation drive unit to be in the first rotation control mode.

8. The apparatus as set forth in claim 1, wherein while the rotation drive unit is being controlled in the second rotation drive mode, the identification data is read from the second recording area taking as a guide the plurality of pits arranged in the pit pattern.

9. The apparatus as set forth in claim 8, wherein when reading of the identification data from the second recording area is complete, the controller controls the rotation drive unit in the first rotation control mode.

10. The apparatus as set forth in claim 1, wherein when the head unit is scanning the first recording area, the controller controls the rotation drive unit according to the frame sync signal extracted from a signal output from the head unit and controls the rotation drive unit according to a clock signal detected from the signal output from the head unit.

11. An optical disc recording and/or playing method, comprising:

rotating, using a rotation drive unit, an optical disc having defined therein a first recording area in which a frame sync signal and data are recorded and a second area having a plurality of pits arranged in a pit pattern and having identification data recorded thereon;

scanning, using a head unit, the rotating optical disc;

controlling the rotation drive unit to be in a first rotation control mode when the head unit scans the first recording area; and controlling the rotation drive unit to be in a second rotation control mode when the head unit scans the second recording area, including:

detecting, for the second recording area, an interval of inversion from maximum and minimum pulse widths of a data signal having a predetermined period between the pits in the pit pattern to form a frame sync signal, and controlling the rotation drive unit such that the interval of inversion of the frame sync signal coincides with a reference length of time, wherein the first and second recording areas are recording areas distinct from each other.

12. The method as set forth in claim 11, further comprising:

determining, based on address data read by the head unit from the optical disc, which of the first and second recording areas the head unit is scanning; and selecting between the first and second rotation control mode based on a result of the step of determining.

13. The method as set forth in claim 12, further comprising:

determining based on address data read by the head unit from the optical disc whether a position scanned by the head unit is a position just before the second recording area and where the mode of controlling the rotation of the rotation drive unit should be switched; and switching a rotation control mode to the second rotation control mode when a result of the step of determining shows that the scanned position is a position for switching the rotation control mode.

14. The method as set forth in claim 13, further comprising:

detecting, when a scanned position is the rotation control mode switching position, an interval of inversion from an output signal supplied when the predetermined pattern read by the head unit is detected; and controlling the rotation drive unit in the second rotation control mode according to the detected interval of inversion.

15. The method as set forth in claim 13, wherein when the scanned position is not any rotation control mode switching position, controlling the rotation drive unit to be in the first rotation control mode.

16. The method as set forth in claim 15, wherein while the rotation drive unit is being controlled in the second rotation control mode, recording the identification data to the second recording area taking as a guide the predetermined pattern preformed in the second recording area.

17. The method as set forth in claim 16, wherein when recording of the identification data to the second recording area is complete, controlling the rotation drive unit in the first rotation control mode.

18. The method as set forth in claim 11, wherein while the rotation drive unit is being controlled in the second rotation drive mode, reading the identification data from the second recording area taking as a guide the predetermined pattern preformed in the second recording area.

19. The method as set forth in claim 18, wherein when reading of the identification data from the second recording area is complete, controlling the rotation drive unit in the first rotation control mode.

20. The method as set forth in claim 11, wherein when the head unit is scanning the first recording area,
controlling the rotation drive unit according to the frame sync signal extracted from a signal output from the head unit, and
controlling the rotation drive unit according to a clock signal detected from the signal output from the head unit.

21. An optical disc rotation controlling method, comprising:
rotating, using a rotation drive unit, an optical disc having defined therein a first recording area in which a frame sync signal and data are recorded and a second recording area having a plurality of pits arranged in a pit pattern and having identification data recorded thereon;
scanning, using a head unit, the rotating optical disc;
controlling the rotation drive unit in a first rotation control mode when the head unit scans the first recording area; and
controlling the rotation drive unit in a second rotation control mode when the head unit scans the second recording area, including;
detecting, for the second recording area, an interval of inversion from maximum and minimum pulse widths of a data signal having a predetermined period between the pits in the pit pattern to form a frame sync signal, and
controlling the rotation drive unit such that the interval of inversion of the frame sync signal coincides with a reference length of time, wherein the first and second recording areas are recording areas distinct from each other.

22. The method as set forth in claim 21, further comprising:
determining, based on address data read by the head unit from the optical disc, which of the first and second recording areas the head unit is scanning; and
selecting between the first and second rotation control mode based on a result of the step of determining.

23. The method as set forth in claim 22, further comprising:
determining, based on address data read by the head unit from the optical disc, whether a position scanned by the head unit is a position just before the second recording area and where the mode of controlling the rotation of the rotation drive unit should be switched; and
switching a rotation control mode to the second rotation control mode when a result of the step of determining shows that the scanned position is the position of switching the rotation control mode.

24. The method as set forth in claim 23, further comprising:
detecting, when a scanned position is the rotation control mode switching position, an interval of inversion from an output signal supplied when the predetermined pattern read by the head unit is detected; and
controlling the rotation drive unit in the second rotation control mode according to the detected interval of inversion.

25. The method as set forth in claim 23, wherein when the scanned position is not any rotation control mode switching position, controlling the rotation drive unit in the first rotation control mode.

26. The method as set forth in claim 21, wherein when the head unit is scanning the first recording area, controlling the rotation drive unit according to the frame sync signal extracted from a signal output from the head unit and controlling the rotation drive unit according to a clock signal detected from the signal output from the head unit.

* * * * *

UNITED STATES PATENT AND TRADEMARK OFFICE
CERTIFICATE OF CORRECTION

| | | |
|---|---|---|
| PATENT NO. | : 7,362,671 B2 | Page 1 of 1 |
| APPLICATION NO. | : 10/398596 | |
| DATED | : April 22, 2008 | |
| INVENTOR(S) | : Yoichiro Sako et al. | |

It is certified that error appears in the above-identified patent and that said Letters Patent is hereby corrected as shown below:

Column 1, line 17, "dis" should read --disc--.

Column 22, line 9, after "second", insert --recording--.

Signed and Sealed this

Sixteenth Day of June, 2009

JOHN DOLL
*Acting Director of the United States Patent and Trademark Office*